May 5, 1964

D. E. GRISWOLD ETAL 3,131,716

FLOW CONTROL VALVES

Filed March 16, 1961

INVENTORS
David E. Griswold
James L. Wingert
BY
Bacon & Thomas
ATTORNEYS

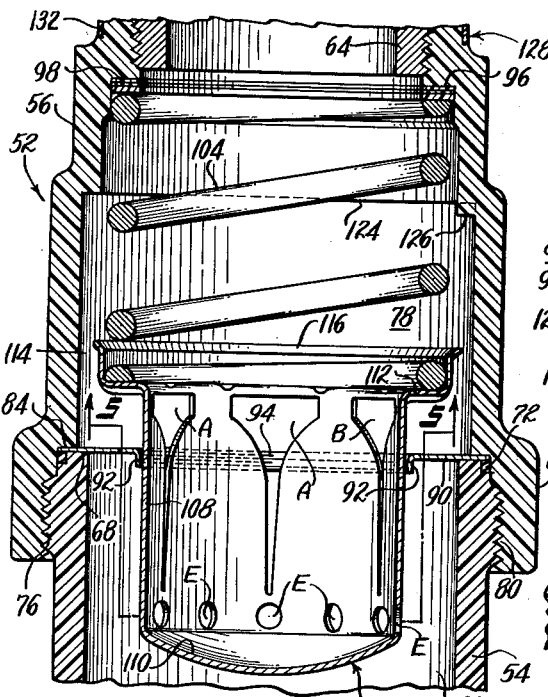
Fig. 4.
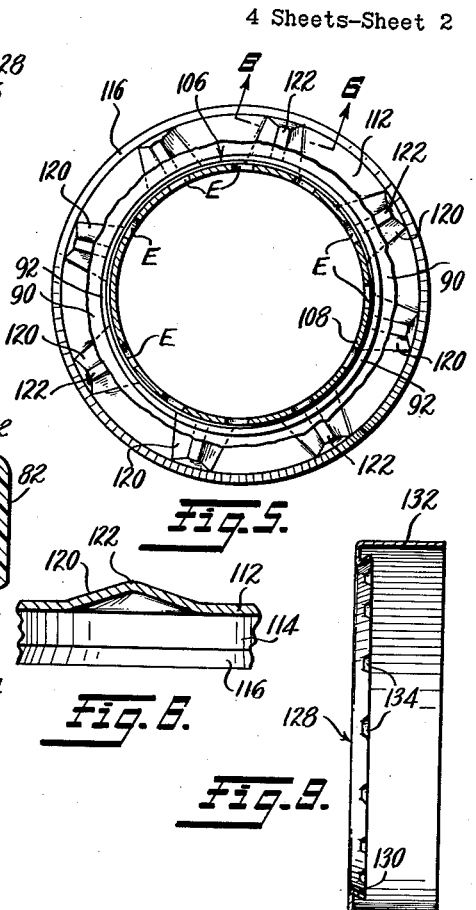
Fig. 5.
Fig. 6.
Fig. 8.
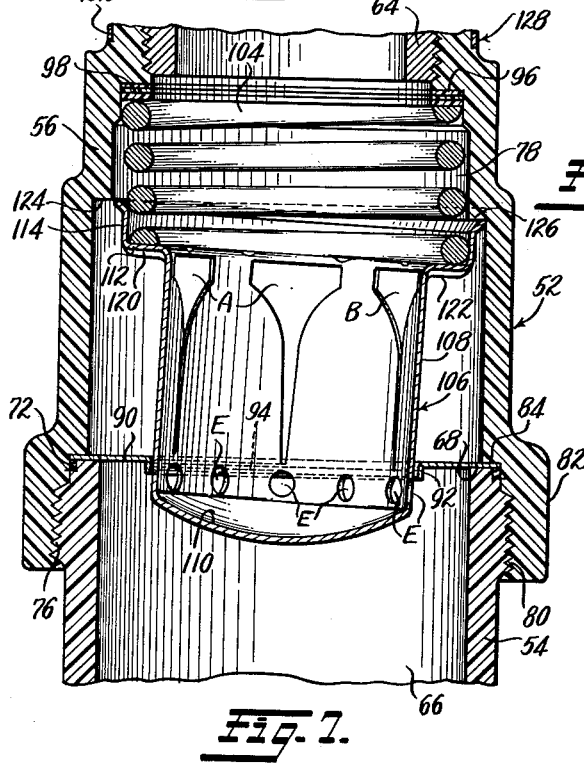
Fig. 7.
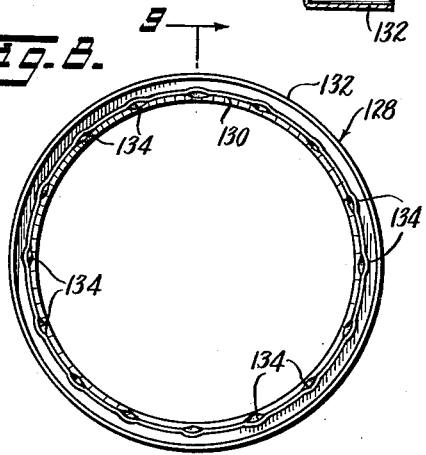
INVENTORS
David E. Griswold
James L. Wingert
BY Bacon & Thomas
ATTORNEYS

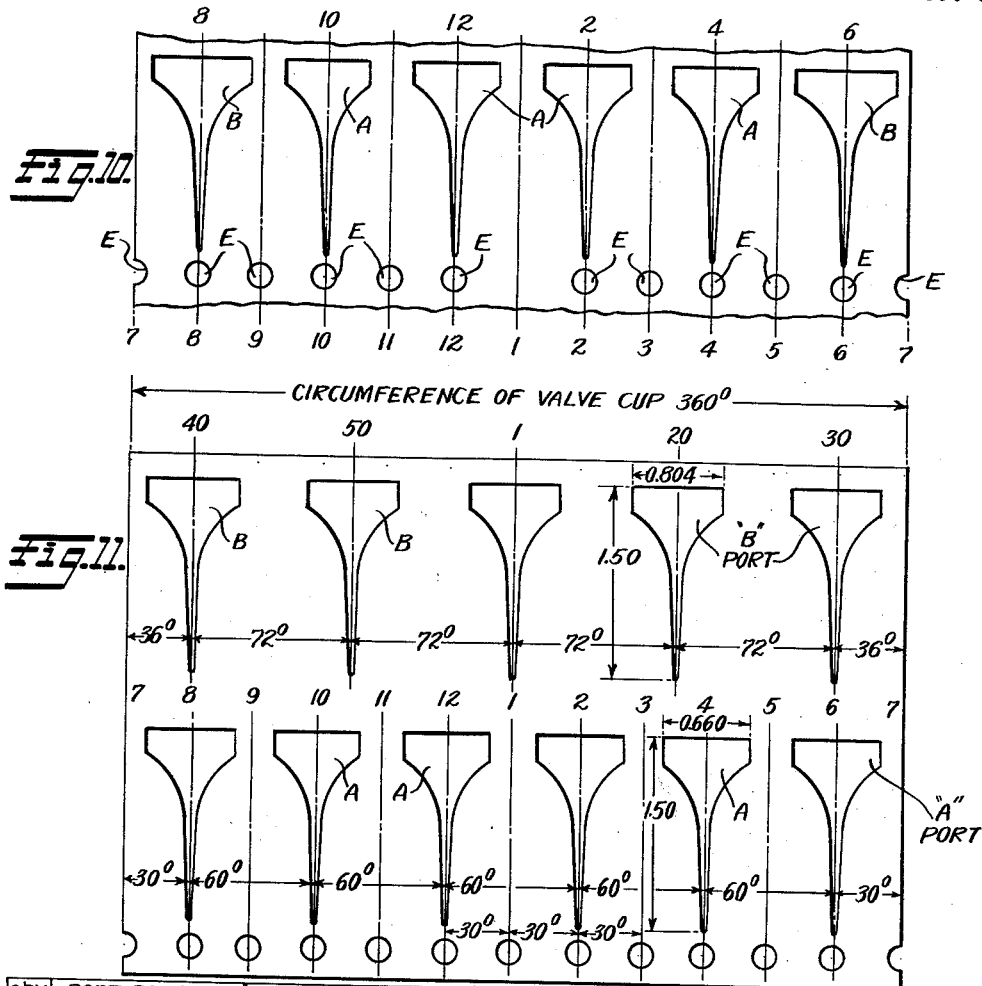

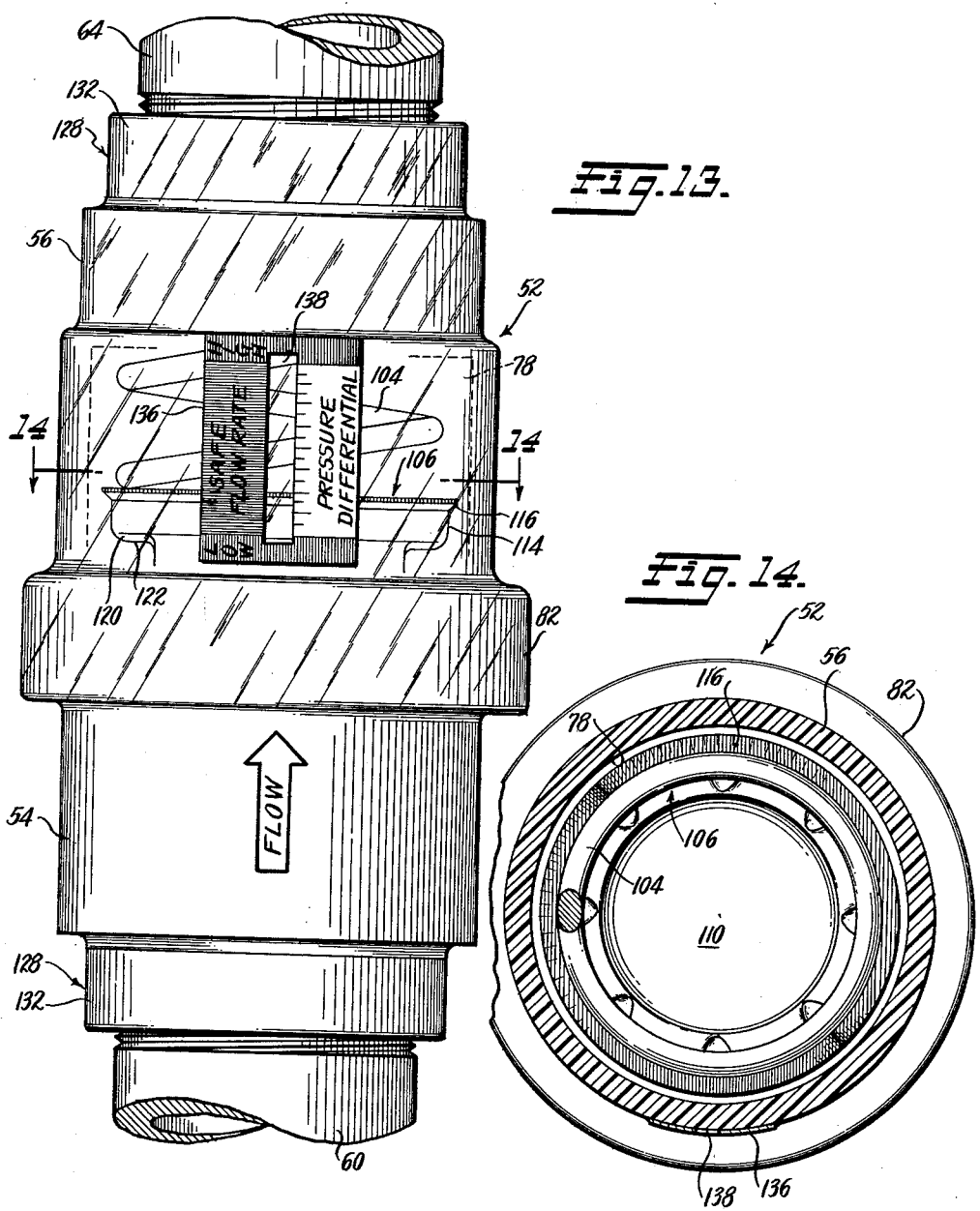

United States Patent Office 3,131,716
Patented May 5, 1964

3,131,716
FLOW CONTROL VALVES
David E. Griswold and James L. Wingert, Costa Mesa, Calif., assignors to Griswold Controls, Costa Mesa, Calif.
Filed Mar. 16, 1961, Ser. No. 96,298
22 Claims. (Cl. 137—503)

The present invention relates to flow control devices and in particular to a flow control valve that will maintain a constant flow rate over a wide range of variations in line pressure.

The invention further relates to a flow control valve of the type aforementioned, which has combined therewith meter means for indicating whether the occurring flow rate is high or low, or at the designed, safe-controlled, flow rate. The indicating means is also preferably calibrated to indicate the actual pressure differential across the valve.

The present flow control valve is designed to operate under a pressure differential range of 2 to 32 lbs. per square inch and to maintain a constant flow rate within this range. It is especially adapted for use in connection with: (1) diatomite-sand-cartridge type filters for limiting flow to the filter at the maximum design rate per square foot of filter area, whereby substantially longer filter runs with sharp reduction in operating costs can be effected; (2) water conditioning equipment to provide inexpensive and foolproof control of backwash and rinse flow rates; (3) pumps to prevent cavitation, motor overloads, and abnormal well draw-down by limiting the flow rate to the designed maximum; (4) with separate meters to provide accuracy and protection by limiting flow rates through the meters to the design maximum; (5) water heaters to retard combustion chamber corrosion by limiting flow through the heater to the design maximum. The foregoing uses of the present flow control valve are merely mentioned as typical, and are not to be construed as limiting the field of utility inasmuch as the valve can be used in any installation requiring a constant flow rate of liquid.

The principal object of the invention is to provide an accurate and dependable flow control device that is directly responsive to the differential pressure acting on the valve element thereof to change its position, as required, to automatically maintain a constant rate of flow through the device.

Another object is to provide a flow control device including built-in meter means for indicating the existing flow rate and the actual pressure differential acting on the valve element.

Another object is to provide a flow control device which is capable of delivering high capacity flow rates at an unusually low pressure differential, for example, 2 lbs. per square inch.

Another object is to provide a flow control device wherein the valve element is a cup that can be provided with ports and by-pass holes at preselected locations for effecting a desired flow rate, and wherein the cup can be formed as a sheet metal stamping, and wherein an orifice plate, cooperable with the cup can also be made as a sheet metal stamping.

Another object is to provide a flow control device having a basic design of a cup or valve element that will provide a wide range of flow capacities simply by using one or more ports of predetermined size and configuration in the cup itself, without making any change in the remaining parts.

A further object is to provide a flow control device including a "floating" cup element having passages arranged at selected circumferential positions so that hydraulic pressure tends to urge the cup element transversely into line contact with a side of the orifice in the orifice plate to prevent vibration and chatter of the cup element.

A still further object is to provide a flow control device wherein the parts are designed to facilitate rapid assembly, proper registration, and proper seating of the various components of the device.

Another object is to provide a flow control device having main body sections that can be formed of transparent or opaque plastic material in an injection molding machine.

Another object is to provide a flow control device having a minimum number of parts and which is compact, simple in construction and design, provides for substantially unobstructed flow, affords ample capacity, and which can be produced at minimum cost.

An important feature of the present flow control device is that it is capable of utilizing a conventional spring with which relatively simple washer means can be associated for adjusting the device to compensate for manufacturing variations in the spring from desired constant characteristics, whereby the springs can be easily made to meet the critical force requirements necessary to maintain a given constant rate of flow.

The invention further contemplates a novel protective and reinforcing band for the pipe-end of the valve body sections, the band being U-shaped in cross-section and made of minimum gauge steel and including a turned-in lip or short leg that has crimped portions providing a dove-tail joint between the band and the plastic material, preventing both axial and rotary movement, so that a strap wrench can be applied to the outside of the band to turn or hold the body sections relative to a connecting pipe.

Other objects and features of the invention will be apparent from the following description taken in conjunction with the accompanying drawings in which:

FIG. 4 is a fragmentary sectional view showing the manner in which the cup engages one side of the opening in the orifice plate to prevent chattering and vibration of the cup after movement of the cup in a direction away from the orifice plate;

FIG. 5 is a sectional view taken on the line 5—5 of FIG. 4, particularly illustrating the crimped portions that are formed in a lateral flange portion of the rim of the cup to stiffen the rim, and provide flow passageways;

FIG. 6 is an enlarged fragmentary sectional view through one of the crimped portions taken on the line 6—6 of FIG. 5;

FIG. 7 is a sectional view similar to FIG. 4, but showing the flared edge of the cylindrical portion of the rim of the cup seated against a shoulder and a limit stop thereon, as occurs at the extreme end of travel of the cup away from the orifice plate;

FIG. 8 is an elevational view of one end of a protective and reinforcing band that is molded in the body sections at the pipe-engaging end thereof;

FIG. 9 is a vertical sectional view through the reinforcing band taken on the line 9—9 of FIG. 8;

FIG. 10 is a diagrammatic developed view illustrating the layout of the ports and by-pass holes of the cup element of a flow control device for providing a flow rate of 65 g.p.m.

FIG. 11 is a diagrammatic, composite layout of various possible port and by-pass hole arrangements that may be selected and formed in the cup element at given circumferential positions to effect any given desired flow rate within the range of capacity of the cup;

FIG. 12 illustrates a chart useful, in connection with the port and by-pass hole arrangements shown in FIG. 11, for selecting predetermined ports and holes to obtain a desired flow capacity in g.p.m.;

Figures 1, 2, 3:
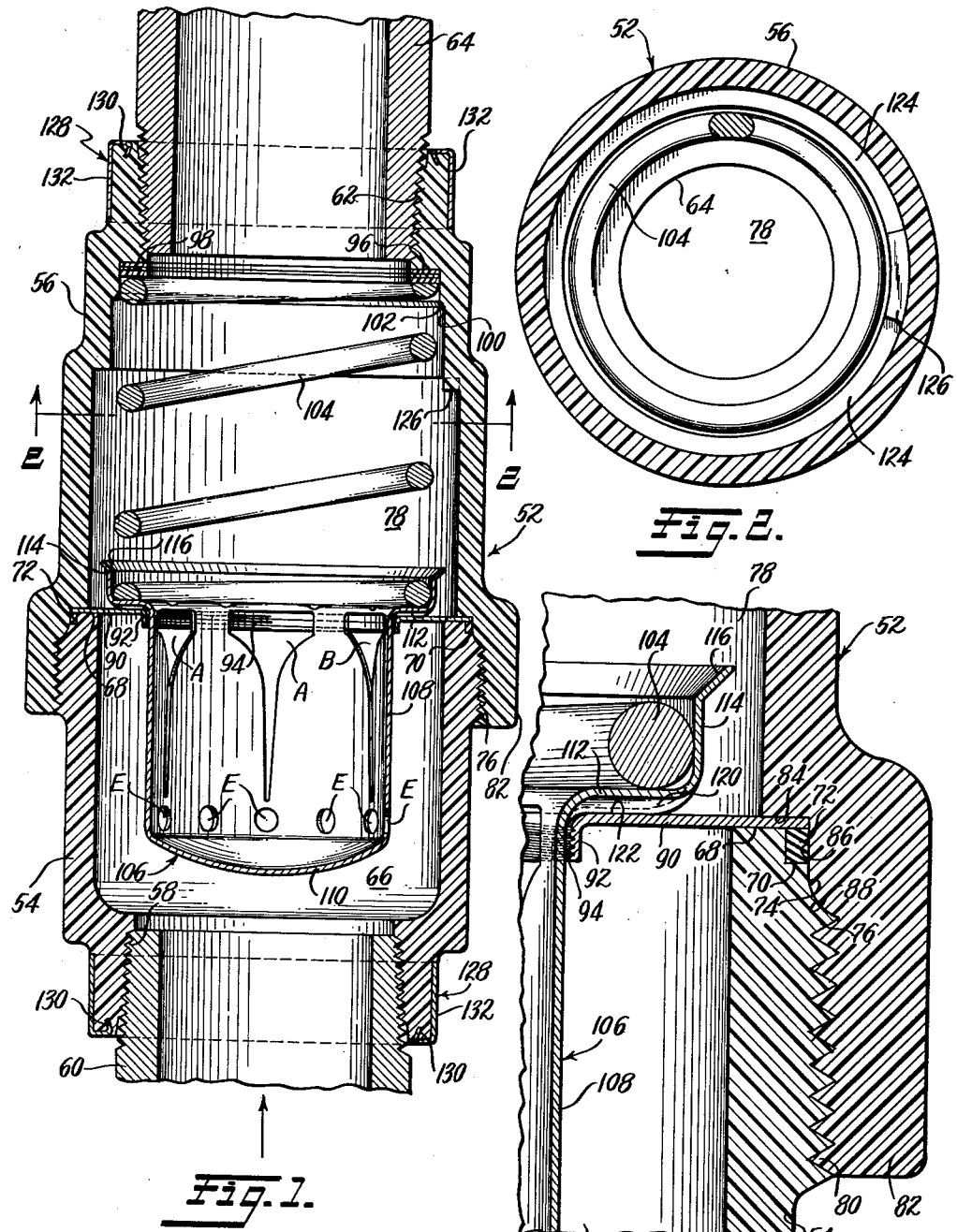
FIG. 1 is a longitudinal sectional view through a flow control device or valve constructed in accordance with the principles of the present invention.
FIG. 2 is a transverse sectional view taken on the line 2—2 of FIG. 1.
FIG. 3 is an enlarged fragmentary sectional view illustrating certain important details of the "floating" cup, the orifice plate and the joint between the sections of the valve body.

FIG. 13 is an elevational view of a flow control device similar to that shown in FIG. 1, but wherein an indicator plate is associated with a transparent housing section and cooperates with the flared edge of the cup to indicate the rate at which liquid is flowing through the valve device and the differential pressure acting on the valve element; and FIG. 14 is a sectional view through the housing and flow rate indicating plate taken on the line 14—14 of FIG. 13.

Referring now to FIG. 1 of the drawings, the flow control device or valve is generally identified by the numeral 52 and comprises a body consisting of a cylindrical male section 54 and a cylindrical female section 56. The section 54 has a threaded inlet opening 58, which may be any desired diameter, depending upon the size of the pipe 60 that is to be attached to the section 54. In one practical embodiment of the invention, the opening 58 may be made of a size to accommodate standard pipe up to 2″ inside diameter. The section 56 has a similar threaded opening 62 that serves as an outlet and is adapted to be connected to a pipe 64.

The section 54 contains a chamber 66 that communicates with the pipe 60. The end 68 of the body section 54 remote from the inlet 58 is flat, FIG. 3, is reduced in diameter and is provided with an annular recess forming a shoulder 70 serving as a seat for a conventional O-ring 72. A tapered portion 74 extends from the edge of the 72. A tapered portion 74 extends from the edge of the shoulder 70 to an external thread 76, which starts at a point spaced longitudinally from the shoulder 70.

The body section 56 contains a chamber 78, which is slightly larger in diameter than the chamber 66. The section 56 has a thread 80 formed within an enlargement 82 at its end remote from the threaded outlet 62. The thread 80 cooperates with the thread 76 to hold the housing sections 54 and 56 in assembled relation.

The section 56 has a shoulder located inwardly of the thread 80 and defined by a transversely extending annular surface 84 and a longitudinally extending cylindrical surface 86. The surface 86 merges with the innermost portion of the thread 80 along a tapered surface 88 that is complementary to the surface 74 on the section 54.

An annular orifice plate 90 having an outside diameter slightly less than that of the cylindrical surface 86 is positioned between the shoulder surface 84, and the end 68 of the section 54 and the O-ring 72, said O-ring providing a seal between the sections 54 and 56 when they are screwed up tightly, so that fluid pressure never acts upon the threads 76 and 80. It will be apparent that in assembling the parts, the tapered portion 88 on the section 54 will serve to guide and center the orifice plate 90 relative to the housing section 56, and will also serve to guide the O-ring 72 and thus facilitate assembly of the orifice plate 90 and establish a seal between the two sections 54 and 56.

The orifice plate 90 is preferably made as a stamping from stainless steel and has a central opening defined by an inturned or axially extending flange 92, which is preferably provided on its inner surface with grooves or threads 94, for a purpose that will be explained later.

The section 56 has a shoulder 96 adjacent the threaded outlet opening 62, which serves as a seat for one or more plastic calibrating washers 98. The body 56 also has a portion 100 of a diameter greater than that of the shoulder 96, but less than that of the chamber 78. The surface 102 between the shoulder-defining cylindrical wall and the wall portion 100 is tapered to facilitate positioning of the washers 98 and to center one end of a compression spring 104 within the chamber 78.

A flow control valve member 106 is disposed within the body sections 52 and 56 and comprises a cup defined by a cylindrical side wall 108 and a convex bottom wall 110. The cup 106 also includes a rim consisting of a transverse flange portion 112 and a longitudinally extending cylindrical portion 114, which is flared outwardly at its end remote from the flange 112, as indicated at 116. The flanged rim of the cup 106 serves as a seat for one end of the spring 104. The flange portion 112 is stiffened by a series of radial ribs 120, FIGS. 5 and 6, that extend in a direction away from the flared cup edge 116. The ribs 120 are V-shaped in circumferential cross-section, as is best shown in FIG. 6. Each rib 120 has a crest 122 that is engageable with one side of the orifice plate 90 when the pressure of the liquid in the flow control device 52 is insufficient to compress the spring 104 and move the cup 106 in a direction toward the outlet 62.

The radial clearance space between the outside diameter of the cylindrical wall 108 of the cup 106 and the crest diameter of the grooves or threads 94 in the orifice plate 90, is only a few thousands of an inch, so that the grooves 94 cause the liquid in the clearance space to form a labyrinth fluid seal between the cup and orifice plate, preventing any substantial flow of liquid through the clearance space. The threads 94 also function as serrations that are effective during movement of the cup 106 to remove any matter that may tend to deposit on its outside surface, thereby providing a self-cleaning action.

The chamber 78 contains a stop shoulder 124, FIG. 1, disposed inwardly of, and of larger diameter than, the shoulder 96. A projection or limit stop 126 is formed on the shoulder 124 adjacent the wall of the chamber 78, as is best shown in FIG. 2. The inner diameter of the shoulder 124 is purposely made smaller than the diameter of the edge 116 of the cup valve 106, and the limit stop 126 is engageable by said edge for preventing vibration and chatter of the cup upon approaching one limit of its travel, as will be explained more fully hereinafter.

The body sections 54 and 56 can be made of metal or any other known material suitable for the purpose. In the interest of economy these sections are preferably made of plastic material in an injection molding machine. The plastic may be opaque or transparent. When the valve includes a flow meter, as in FIG. 13, at least the section 56 is made of transparent material such as the well known "Lucite" or "Plexiglas."

FIGS. 8 and 9 illustrate a ring or reinforcing band 128 that is molded onto the pipe-receiving end of the body sections 54 and 56. The band 128 is made of light gauge steel and preferably plated with cadmium to resist corrosion. As is shown in FIG. 9, the band 128 is of generally U-shaped cross-section and has an inner leg or lip 130 that is substantially shorter than the outer leg 132. The lip 130 is bent outwardly on an angle of about 25° to the axis of the band and is provided with a series of circumferentially spaced, crimped portions 134 formed by further bending the lip outwardly at localized points on a slightly greater angle.

As is shown in FIG. 1, the lip 130 is entirely embedded in the plastic material and is disposed outwardly of the threaded openings 58 and 62. The outwardly bent lip 130 and the crimped portions 134 provide a sort of corrugated, interlocking, dovetail joint with the plastic material, whereby the band 128 is prevented from turning as well as moving axially relative to the section upon which it is mounted.

The band 128 serves the dual purpose of reinforcing the threaded end of the body sections 54 and 56 as well as providing a surface that can be engaged by a strap wrench for either holding or turning the body sections relative to the pipes 60 and 64 during assembly therewith.

As has been indicated hereinbefore, the present flow control valve includes a basic cup design, whereby the use of a different number and arrangement of openings will adapt the same to provide a selected constant flow rate in the range of 10 to 75 g.p.m., and within a pressure differential range of 2 to 32 lbs. per sq. in. The basic design also provides for inducing certain unbalanced, laterally-acting hydraulic forces effective upon the cup 106 to positively prevent otherwise unavoidable vibration and chatter of the "floating" cup relative to the orifice plate 90 as a result of variations in the differential pressure and spring force acting on the cup.

In keeping with the above, the cup 106 may be provided with one or more ports A and/or B, and with none or one or more by-pass holes C, D, E or F (see FIGS. 10, 11 and 12). The ports A and B are of equal length and of generally similar configuration but with the ports B having a wider base portion. The ports A are each designed to provide a flow rate of 10 g.p.m.; whereas, the ports B are each designed to provide a flow rate of 12.5 g.p.m. A 10 g.p.m. port and a 12.5 g.p.m. port can be used in multiples to provide all flow capacities between 20 and 75 g.p.m. in 5 g.p.m. increments, as shown in the chart of FIG. 12. The by-pass holes C, D, E and F are circular and have diameters of 0.184", 0.194", 0.202" and 0.210", respectively, to correspond with the flow rates indicated in FIG. 12.

The spring 104 is of the type which has a uniform rate of change of spring force. This means that in order for the valve to maintain a constant rate of flow, the capacity of the port opening would have to change in accordance with a predetermined well known area-determining formula, or, in other words, the area would change in inverse proportion to the square root of the pressure differential. The formula expressed mathematically would be:

$$A = \frac{K}{\sqrt{X}}$$

where $A$=the area, $X$=the pressure differential, and $K$=a constant.

With the present cup porting design, the valve performs its flow control functions entirely separately from changes in the discharge or supply pressure. The specific configuration of the ports A and B in relation to the spring characteristics is a definite relationship governed by mathematical law and can be calculated to provide extremely accurate flow control.

FIG. 11 is a digrammatic, developed view illustrating the circumferential location of ports of the type of A and B, and holes C, D, E and F corresponding to the port and hole positions shown in the chart in FIG. 12. It will be noted that the horizontal length of FIG. 11 represents 360° or the entire circumference of the valve cup. In the upper portion of FIG. 11, a row of 5 ports is shown located on line positions 72° apart marked 1, 20, 30, 40, 50. The second row of ports is located on lines 60° apart and passing through positions marked 2, 4, 6, 8, 10, and 12. The row of circular by-pass holes in FIG. 11 is located upon lines 30° apart and coincide with positions respectively marked 1–12, inclusive. It will be noted that position No. 7 is at the extreme edges of the figure. It will also be noted, for example, that the position numbers of the second row of ports corresponds to the position numbers of alternate by-pass holes. It will be still further noted, for example, the No. 40 position of the first row of holes coincides within 6° of the No. 8 position of both the second row of ports and by-pass holes. This is also true of the port position No. 30 of the first row of ports, which coincides within 6° of position No. 6 of the second row of ports and the row of by-pass holes.

It will be apparent from the foregoing, and in light of the chart shown in FIG. 12, that for flow rates of 10 to 55 g.p.m., as shown, the ports are located on one or more of the lines corresponding to the port position Nos. 1, 20, 30, 40, 50, and 7. The corresponding by-pass hole positions, and the selected by-pass holes, are located on one or more lines at position Nos. 3 to 11, inclusive. For flow rates of 60 to 75 g.p.m. the ports A and/or B are located on lines corresponding to the second row of ports in FIG. 11, that is, in position Nos. 2, 4, 6, 8, 10, and 12. By-pass holes E and F are correspondingly located on lines corresponding to position Nos. 1 to 12, inclusive.

The rate of flow of liquid through the valve 52, with any given strength of spring 104, will depend upon the area and configuration of the openings that are formed in the side wall 108 of the cup 106. By way of illustrating an operative example of the cup 106, FIG. 10 has been included to show the location of the ports and openings for a designed flow rate of 65 g.p.m., as prescribed by the chart of FIG. 12. Thus, it will be noted that ports A are located along lines corresponding to position Nos. 2, 4, 10, and 12, and that ports B are located on lines corresponding to position Nos. 6 and 8. It will also be noted that by-pass holes E are located on lines corresponding to position Nos. 2 to 12, there being no port on the line corresponding to position No. 1. Instead, the cup wall is imperforate along the line 1, for a purpose which will be explained later.

It will be understood that by employing certain by-pass holes and various combinations of ports A and B, or selecting a specified number of A ports, or a specified number of B ports, alone, the cup 106 can be stamped with the proper ports and holes to effect certain desired flow rates from 10 to 75 gallons per minute, as indicated in the left-hand portion of the chart of FIG. 12. For example, if a valve is to have a capacity of 20 g.p.m., then two A ports (each with a flow capacity of 10 gallons per minute) are selected and formed in the cup at the position Nos. 30 and 40. For a flow capacity of 35 gallons per minute, one A port is selected with two B ports (the latter each having a flow capacity of 12½ gallons per minute), with the A port located in position No. 1 and the B ports located in the No. 30 and 40 positions. For a flow capacity of 65 gallons per minute, which corresponds to the instant design of the cup 106 shown in FIG. 10, four A ports and two B ports are selected, with the A ports in the No. 2, 4, 10 and 12 positions and the B ports in the No. 6 and 8 positions. By-pass holes C, D, E or F are provided in the cup in the corresponding position numbers shown in FIG. 11.

It will be noted from the chart of FIG. 12, that for all flow rates, except the maximum flow rate of 75 gallons per minute, the ports and/or hole positions are located so that the hydraulic force acting on the interior of the cup is unbalanced or biased in favor of exerting a force along the line at the No. 7 position to force that part of the cup against the flange 92 of the orifice plate 90 to provide a "line" bearing. This is done purposely in order to maintain one side of the cup 106 in contact with the orifice flange to prevent chattering or vibration of the cup.

It will be understood from FIG. 1 that the cup 106 is mounted for substantially free floating movement within the orifice plate 90. That is to say, the cup 106 is free to move longitudinally and transversely of the opening in the orifice plate at all times and is even free to rock or tilt, as when the cup is in the extreme limit of its travel away from the orifice plate, as shown in FIG. 7. The chamber 78 is considerably larger in diameter than the spring 104, so that it imposes no binding effect on the spring, but permits the free coils to move laterally with the cup 106 as it moves or tilts.

In the normal use of the device, the valve cup 106 and the spring 104 function as a substantially free floating assembly, always assuming a position resulting from the equalizing of the hydraulic forces acting on opposite sides of the valve cup area and the mechanical spring force. The result is that the assembly is extremely sensitive and subject to movement in any direction because of the various pressure flow and turbulence force factors. It has been found as a consequence, that there is a tendency for the cup 106 to vibrate or chatter under certain conditions.

First, under conditions of liquid flowing through the device, and beginning with the minimum flow rates, vibration of the cup may start when the valve cup 106 is first moved away from the orifice plate and may continue and occur at any point until the valve cup first contacts the travel limit stop provided by the projection 126 within the body section 56.

It has been found that the vibration and chatter thus occurring can be controlled by providing a degree of hydraulic unbalance or side force, effective to hold a straight bearing surface of the valve cup 106 in contact with a point of the orifice opening. The hydraulic unbalance is accomplished by so spacing the valve ports and by-pass holes that the vector summation of any unbalanced hydraulic force produces a force of the desired magnitude and direction to hold the selected straight line bearing surface of the valve cup in point contact with the orifice plate. This is accomplished as explained above.

Secondly, without the limit stop 126, there was a tendency for the cup 106 to vibrate or chatter at the time that it first made contact with the shoulder 124 and the point at which the valve cup rested solidly against the shoulder. The reason for this is that the initial contact was often at a single point and a rapid vibration condition would occur as the valve cup 106 oscillated between the initial and final contact positions. This objectionable vibration was overcome by providing the limit stop 126. This stop is approximately ⅛" high so that the valve cup 106 must always first contact the limit stop before it can reach a second or final stop by engaging the shoulder 124 at a point diametrically opposite the limit stop 126. With the present construction a substantial additional force must be applied through the valve cup against the limit stop to hold it in firm contact therewith before the cup can be tilted to the position shown in FIG. 7, in which it firmly engages the diametrically opposite point of the shoulder 124. In other words, by the time that the second contact point is reached, the cup 106 is held with sufficient firmness against the limit stop 126 to eliminate the objectionable oscillating condition.

In the present construction, as line pressure conditions change or fluctuate, the cup 106 automatically positions itself within the orifice plate 90 to expose more or less of the graduated area of ports A and/or B to the line flow. This decreases or increases the pressure absorbing range of 2 to 32 p.s.i. It will be noted from FIG. 11 that the ports A and B are 1.50" long and that the base of port A is 0.660" wide and the base of port B is 0.804" wide. Thus, the ports are so shaped as to provide an area relative to the orifice plate 90 such that every increment of movement of the cup 106, in response to a given range of pressure differential thereacross, will produce a substantially constant flow through said ports.

Moreover, with the present design the washers 98 may be made of different thickness, for example, 0.062", 0.031" and 0.16" to provide for adjustment of the compression of the spring on ¹⁄₆₄" increments. Such adjustment is necessary because at the point of minimum pressure differential a very slight change in spring force results in a substantial change in the flow rate to offset this force. The washers 98 also provide for inexpensive spring adjustment for easily setting the spring force to the desired value, thereby enabling springs with commercial tolerances to meet more critical force requirements.

FIGS. 13 and 14 illustrate a flow valve 52 wherein the section 56 is made of transparent plastic material, for example, "Lucite" or "Plexiglas" in order that the flared edge portion 116 of the valve cup 106, which is colored red, will be visible therethrough, and so that it can co-operate with indicator means 136 to indicate whether the flow rate is high, low, or at a safe-controlled rate.

The indicator means may be molded in the section 56 or applied thereto as a separate plate, as shown. In FIG. 13, the indicator plate 136 has both ends colored red with the word Low nearest the enlargement 82, and the word High nearest the limit stop 126. The indicator plate 136 has a window 138 and is colored blue on one side of the window, and bears the legend Safe Flow Rate. The portion of the indicator plate 136 on the other side of the window is provided with graduations for indicating the Pressure Differential occurring in the flow valve.

Thus, the valve 52 shown in FIG. 13 is a flow control-meter valve in that it includes a built-in meter for indicating the condition of flow and also the pressure differential acting on the cup element 106. This feature is of considerable importance in that it eliminates the need for a separate flow meter normally required when it is desired to check the rate of flow through a flow control valve. The feature is of further importance in that a Low indication may serve as a warning that equipment such as a filter may be clogged and require servicing.

It will be understood that various changes may be made in the proportions and arrangement of the parts of the flow control valve and flow control-meter valve disclosed herein, without departing from the principles of the invention or the scope of the appended claims.

We claim:

1. A flow control valve, comprising: a valve body having an inlet and an outlet; an orifice plate in said body disposed between said inlet and outlet; a cup element having a cylindrical body floatingly disposed in said orifice plate for axial movement relative thereto and having a flange portion engageable with the side of said orifice plate nearest to said outlet; and a compression spring between said flange and said outlet for yieldably opposing movement of said cup in a direction toward said outlet, said cup having a side wall with axially elongated openings extending therethrough cooperating with said orifice plate during axial movement of said cup relative to said orifice plate and being of a size and number and so shaped as to provide an area relative to the orifice plate such that every increment of movement thereof, in response to a given range of pressure differential thereacross, will produce a substantially constant flow therethrough.

2. A flow control valve as defined in claim 1, in which the valve body comprises tubular sections connected together by a threaded joint, and wherein one of said sections has an annular shoulder and the orifice plate is mounted between said shoulder and the adjacent end of the other section.

3. A flow control valve as defined in claim 1, in which the orifice plate is annular and has an axially extending inner flange provided with grooving for forming a labyrinth fluid seal with the cylindrical body portion of said cup.

4. A flow control valve as defined in claim 2, in which the orifice plate is annular and has a plain outer marginal edge, and wherein the one section has an external thread at one end portion thereof and a shoulder defined by a groove of an outer diameter approximately the same as that of the orifice plate, and wherein a sealing ring is disposed in the groove between said shoulder and one side of said orifice plate and forms a seal between the body sections in advance of the threads.

5. A flow control valve as defined in claim 1, in which the openings in the side wall of the cup are arranged so that an unbalanced hydraulic force is provided within the cup for urging a point on one side of the cup into contact with the edge of the orifice plate opening.

6. A flow control valve as defined in claim 1, in which the valve body has a limit stop that is engageable by the flanged portion of the cup as the cup approaches one extreme position of its travel in a direction away from the orifice plate.

7. A flow control valve as defined in claim 6, wherein the limit stop projects from a shoulder on the valve body and the shoulder is disposed in the path of travel of the cup, and serves as a further limit stop for the cup.

8. A flow control valve as defined in claim 1, in which the flange portion is part of the rim in the cup and includes an annular transverse flange and a cylindrical flange extending longitudinally from the outermost portion of said transverse flange in a direction away from said cup side wall.

9. A flow control valve as defined in claim 8, in which the cylindrical flange is outwardly flared at its end remote from the transverse flange and wherein the valve body has a stop on the interior thereof, and wherein the flared end of the cylindrical flange engages said stop.

10. A flow control valve as defined in claim 8, in which the transverse flange has a series of circumferentially spaced, radially extending ribs to stiffen the same and which ribs contact the orifice in one extreme position of travel of the cup element.

11. A flow control valve, comprising: a valve body having an inlet and outlet; an orifice plate in said body disposed between said inlet and outlet; a cup element having a body slidably disposed in said orifice plate and having a flange portion engageable with the side of said orifice plate nearest to said outlet; a compression spring between said flange and said outlet for yieldably opposing axial movement of said cup in a direction toward said outlet, said cup having a sidewall with axially elongated passages extending therethrough cooperating with said orifice plate during axial movement of said cup relative to said orifice plate and being of a size and number and so shaped as to provide an area relative to the orifice plate such that every increment of movement thereof, in response to a given range of pressure differential thereacross, will produce a substantially constant flow therethrough, at least that portion of the valve body enclosing the flange being made of transparent material so that said flange is visible therethrough; indicator means on the transparent portion of said valve body along the path of movement of said cup, said indicator means having indicia cooperable with the flange of said cup for indicating the rate of flow of liquid through said valve.

12. A flow control valve as defined in claim 11, in which the indicator means includes indicia to indicate whether the flow rate is high or low, or is at a safe-controlled rate.

13. A flow control valve as defined in claim 11, in which the indicator means is provided with indicia to indicate the differential pressure acting upon the cup element.

14. A flow control valve as defined in claim 11, in which the end of the flanged portion is provided with a coating of colored material, whereby its position relative to the indicating means can be more readily observed.

15. A flow control valve as defined in claim 11, in which the indicator means is in the form of a plate carried by the transparent portion of the body, and wherein said plate has an opening through which the flange is visible.

16. A flow control element for use in a flow control valve, comprising: a sheet metal cup having a bottom wall, a cylindrical side wall provided with passages extending therethrough, and a rim portion including an annular horizontal flange and a cylindrical flange extending axially from the outermost portion of said horizontal flange in a direction away from said cup side wall, said axially extending flange portion being outwardly flared at its end remote from said horizontal flange, said horizontal flange having a series of circumferentially spaced, radially extending ribs to stiffen the same, said ribs extending in a direction away from said cylindrical flange.

17. A flow control valve as defined in claim 1 in which the valve body includes means engageable by the flange portion of the cup as the cup approaches the extreme position of its travel in a direction toward said outlet, to limit movement of said cup.

18. A flow control valve, comprising: a body having an inlet and an outlet; an orifice plate in said body disposed between said inlet and said outlet; a cup element having a body floatingly disposed in said orifice and having a flange portion engageable with the side of said orifice plate nearest to said outlet; a compression spring between said flange and said outlet for yieldably opposing movement of said cup in a direction toward said outlet, said cup having a side wall with openings extending therethrough cooperating with said orifice plate during axial movement of said cup relative to said orifice plate and being of a size and number and so shaped as to provide an area relative to the orifice plate such that every increment of movement thereof, in response to a given range of pressure differential thereacross, will produce a constant flow therethrough; and means associated with said body for indicating said given pressure differential.

19. A flow control valve as defined in claim 18, in which the body has its inlet at one end thereof and its outlet at the opposite end thereof and wherein said inlet and outlet are internally threaded to receive a threaded pipe, said inlet and outlet each being surrounded and reinforced by a cylindrical band comprising an annular body of U-shaped cross-section, including a base, an outer leg and an inner leg, the inner leg of the U being of smaller axial dimension than the outer leg and having a series of circumferentially spaced crimps formed therein embedded in said body to effect a positive interlocking connection therewith.

20. An end ring as defined in claim 19, in which the crimps comprise portions extending outwardly at an angle relative to the remainder of the inner leg.

21. An end ring as defined in claim 19, in which the inner leg lies on an angle of about 25° to the axis of the ring.

22. A flow control element as defined in claim 16, wherein the passages in the side wall are of greater total area on one side of a diametrical plane through the cup than on the other side of said diametrical plane, whereby when said cup is mounted in a valve containing an orifice opening floatingly receiving said cylindrical side wall, fluid pressure will tend to bias said cup laterally in said opening in the direction of the side wall having the openings of smaller total area.

References Cited in the file of this patent

UNITED STATES PATENTS

| | | |
|---|---|---|
| 724,000 | Foster | Mar. 31, 1903 |
| 1,065,974 | Shafner | July 1, 1913 |
| 1,803,872 | Shaw | May 5, 1931 |
| 2,102,017 | McWane | Dec. 14, 1937 |
| 2,206,356 | Hutchings | July 2, 1940 |
| 2,262,807 | Larner | Nov. 18, 1941 |
| 2,294,568 | Neilsen | Sept. 1, 1942 |
| 2,683,464 | St. Clair | July 13, 1954 |
| 2,697,352 | Umphrey | Dec. 21, 1954 |
| 2,954,245 | Clark | Sept. 27, 1960 |
| 2,970,561 | Ashwood | Feb. 7, 1961 |

FOREIGN PATENTS

| | | |
|---|---|---|
| 366,022 | France | July 13, 1906 |
| 332,451 | Germany | Jan. 31, 1921 |